No. 838,796. PATENTED DEC. 18, 1906.
W. H. MILTON.
MOTOR DRIVEN PLOW.
APPLICATION FILED MAR. 7, 1905.
6 SHEETS—SHEET 1.
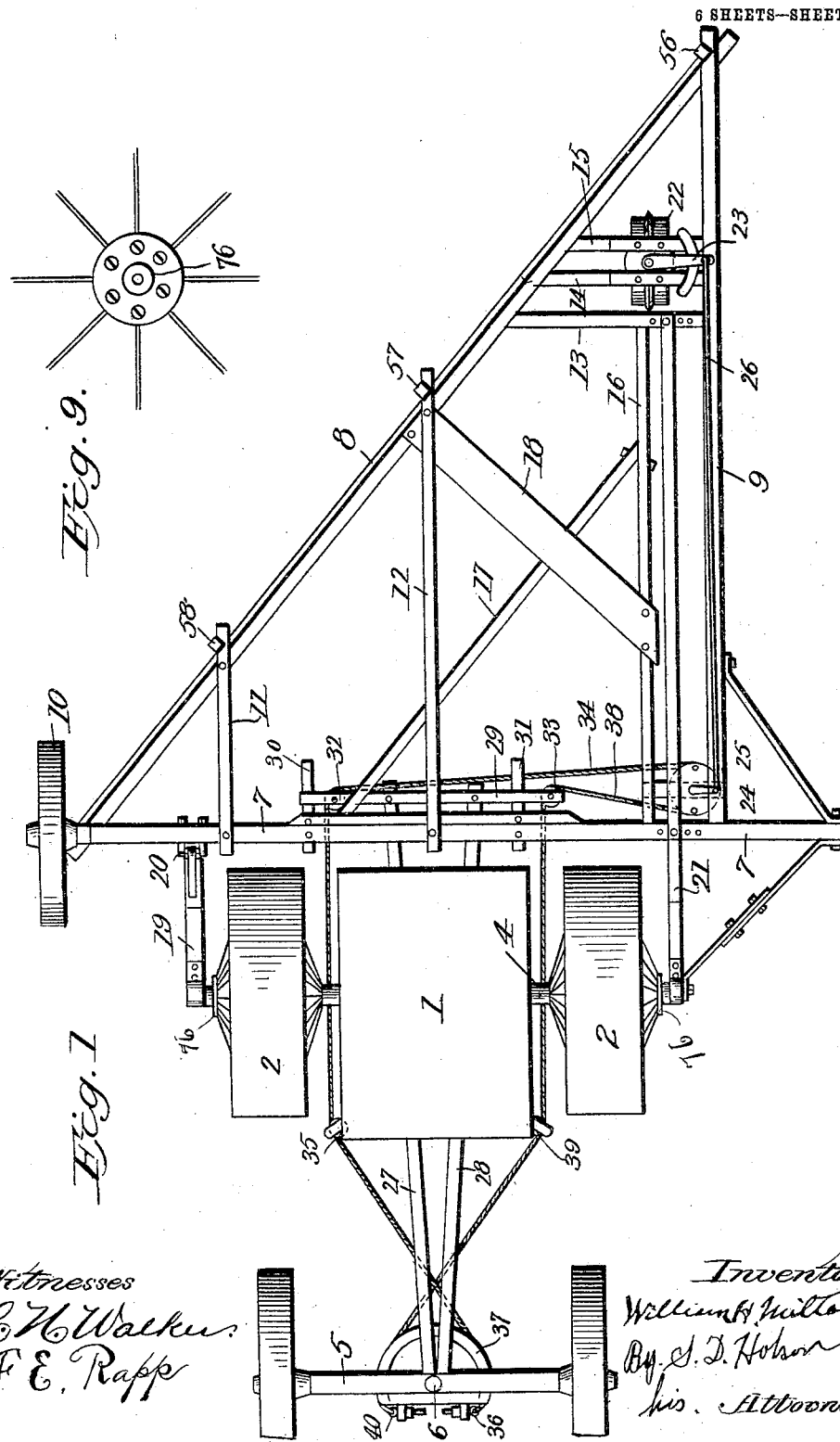
Witnesses
C. H. Walker
F. E. Rapp
Inventor.
William H. Milton
By S. D. Hobson
his Attorney.

No. 838,796. PATENTED DEC. 18, 1906.
W. H. MILTON.
MOTOR DRIVEN PLOW.
APPLICATION FILED MAR. 7, 1905.
6 SHEETS—SHEET 2.
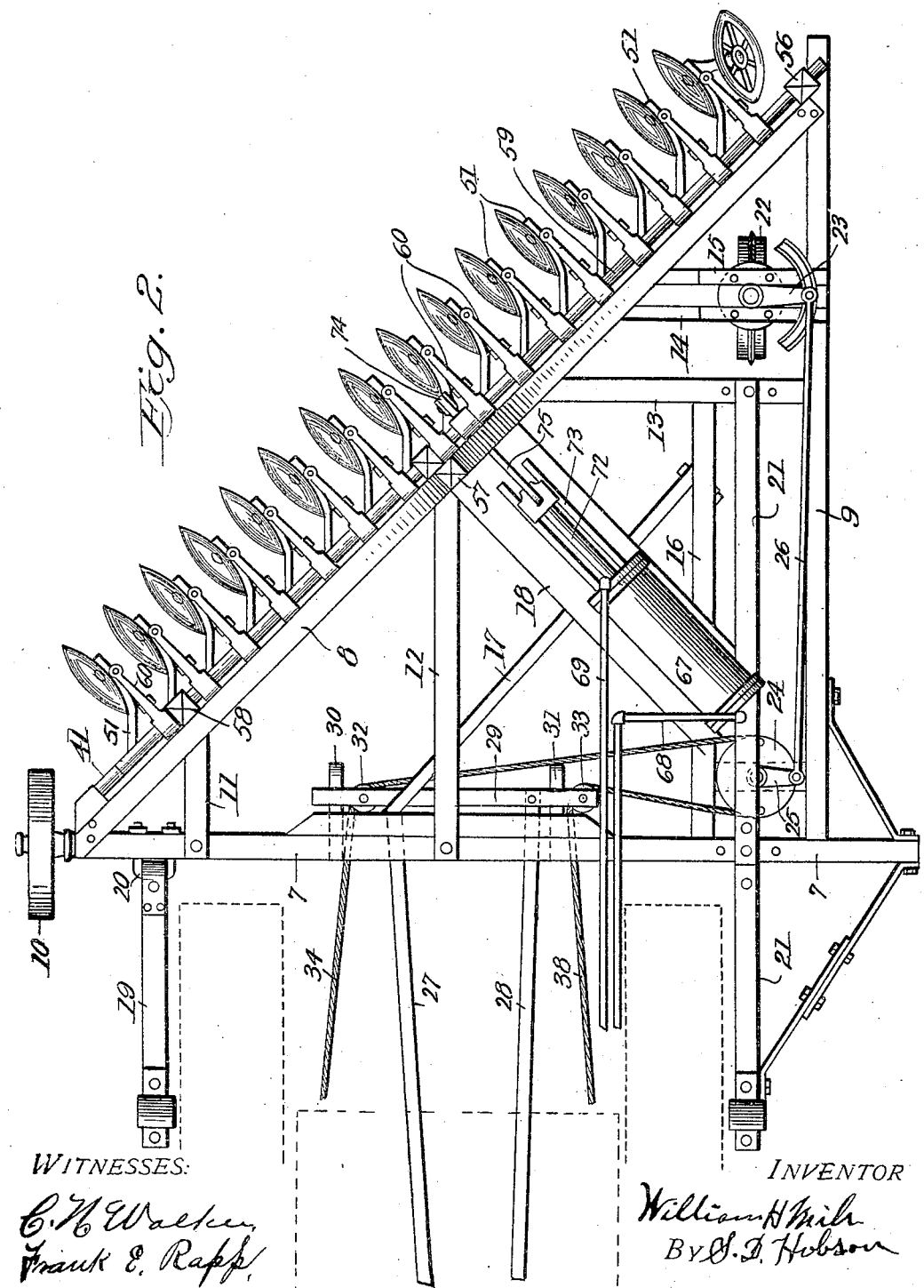
WITNESSES:
C. H. Walker
Frank E. Rapp
INVENTOR
William H Milton
By S. D. Hobson
Attorney

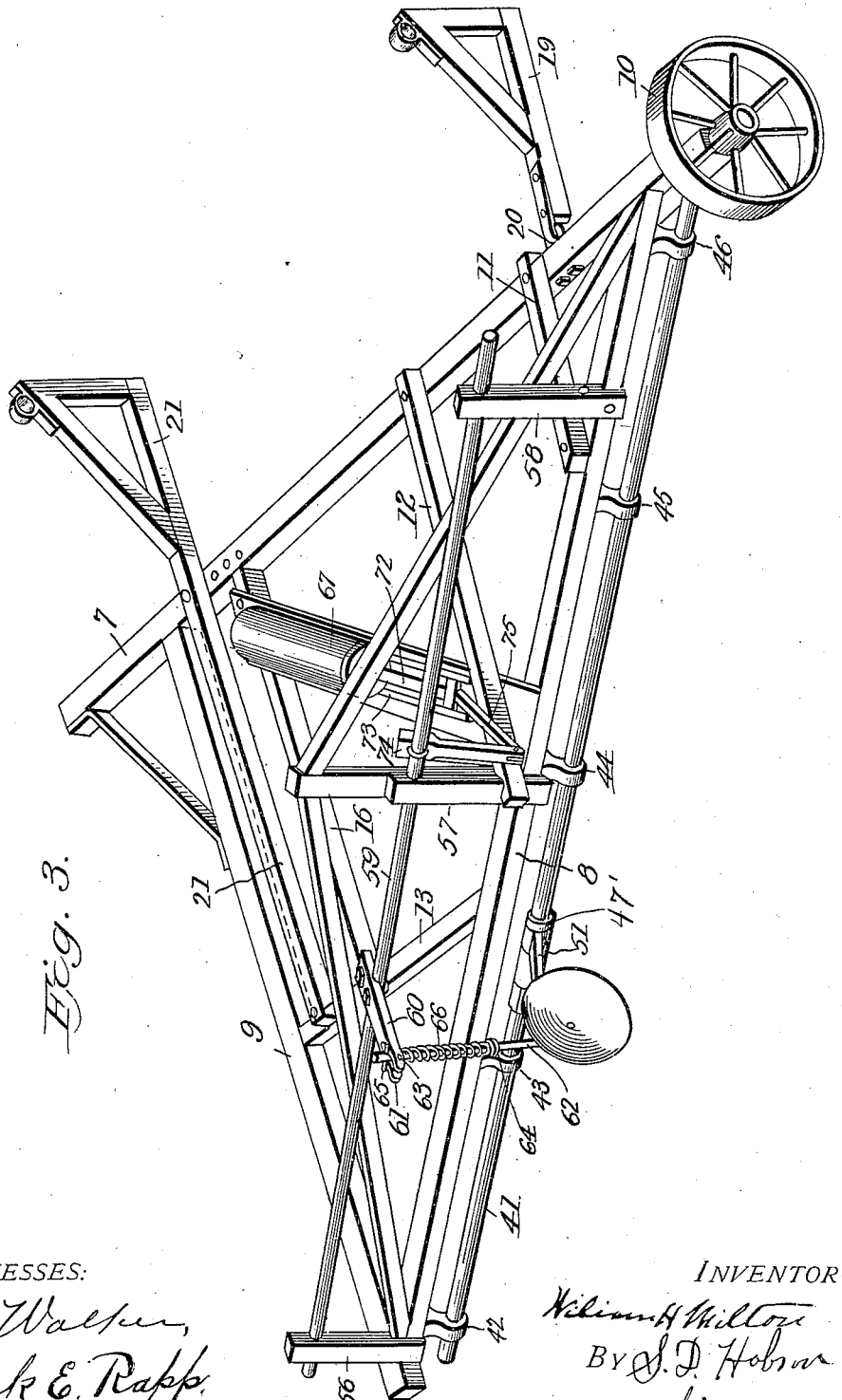

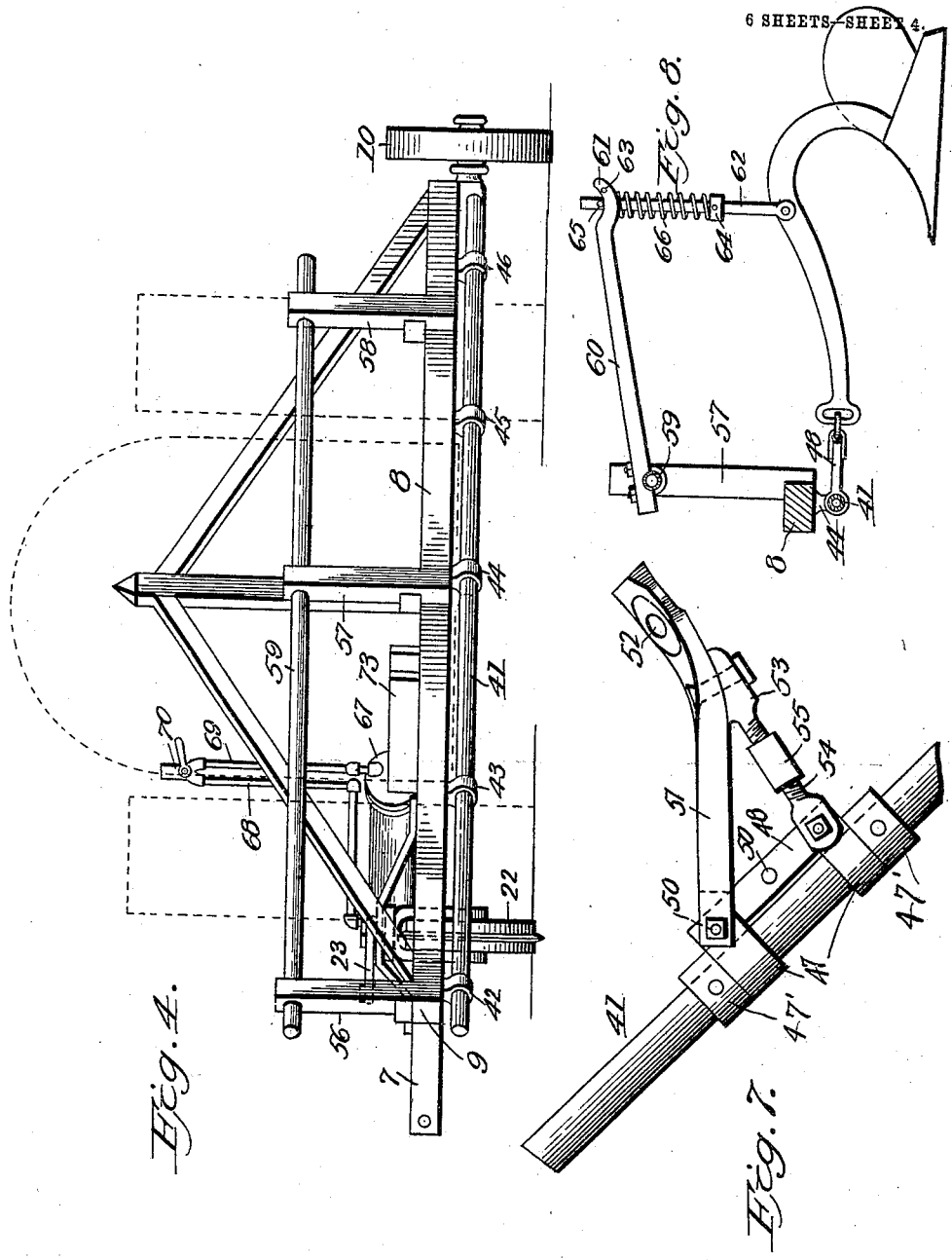

No. 838,796. PATENTED DEC. 18, 1906.
W. H. MILTON.
MOTOR DRIVEN PLOW.
APPLICATION FILED MAR. 7, 1905.
6 SHEETS—SHEET 5.
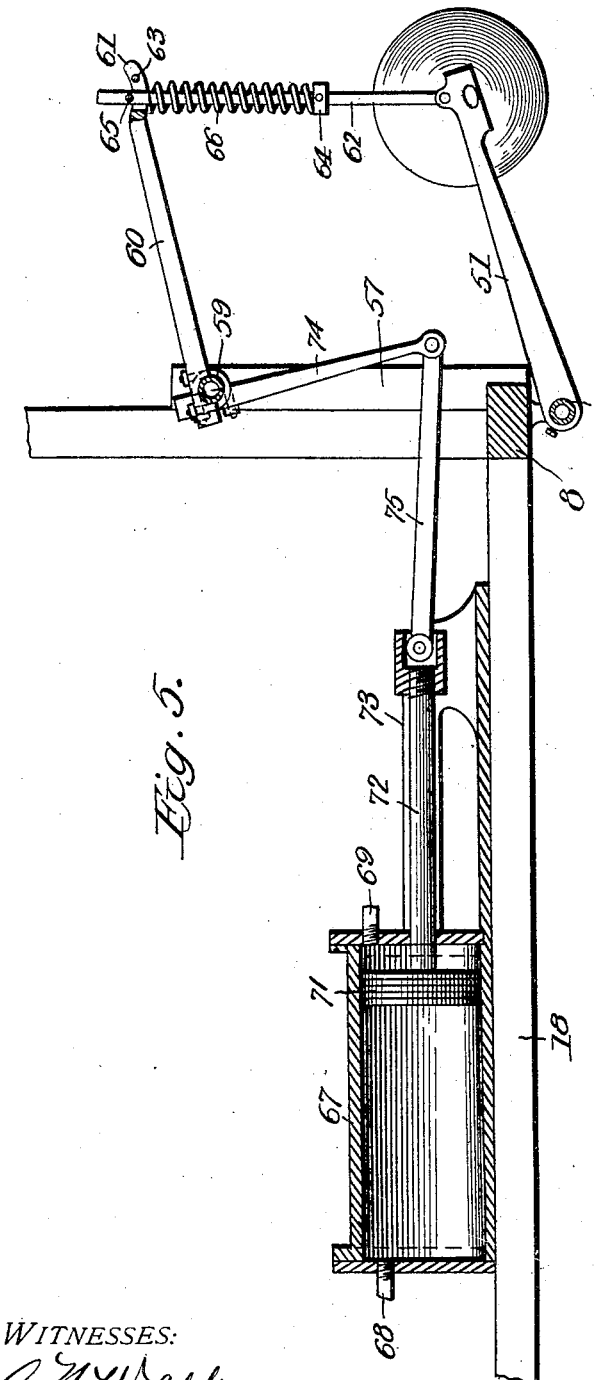
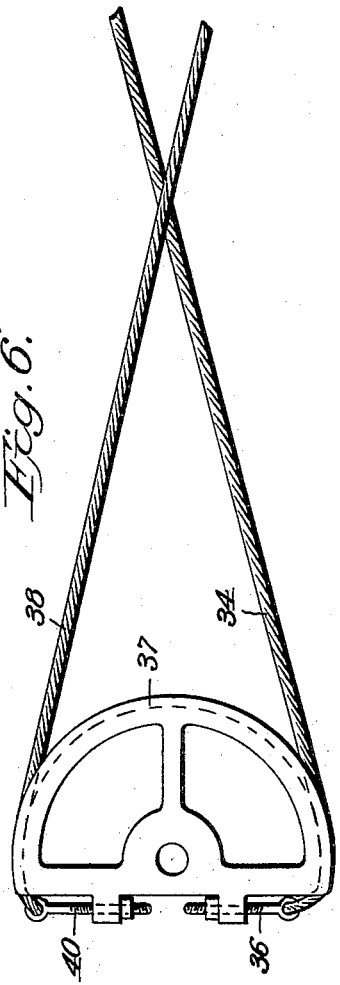
WITNESSES:
C. H. Walker
Frank E. Rapp
INVENTOR
William H. Milton
By S. D. Hobson
his Attorney

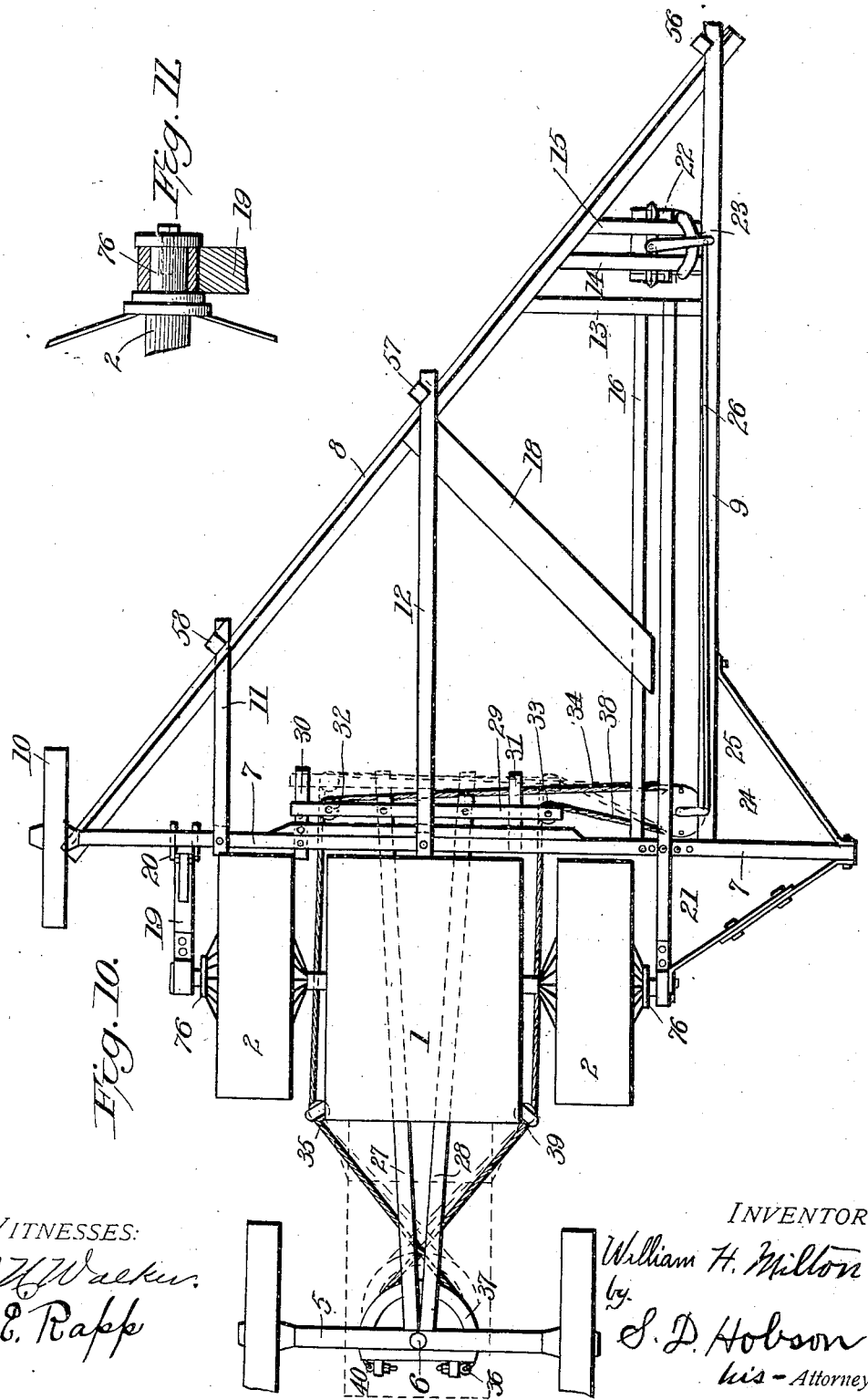

UNITED STATES PATENT OFFICE.

WILLIAM H. MILTON, OF STAFFORD, KANSAS.

MOTOR-DRIVEN PLOW.

No. 838,796.  Specification of Letters Patent.  Patented Dec. 18, 1906.

Application filed March 7, 1905. Serial No. 248,805.

*To all whom it may concern:*

Be it known that I, WILLIAM H. MILTON, a citizen of the United States, residing at Stafford, in the county of Stafford and State of Kansas, have invented new and useful Improvements in Motor-Driven Plows, of which the following is a specification.

My invention relates to agricultural implements, and more particularly to that class known as "motor-driven plows."

The object of the invention is to provide a motor-driven plow having a compact frame and provided with one or more sets of disk-shaped soil-working devices arranged in gangs and consisting of from two to twenty disks.

Furthermore, the object of the invention is to provide a motor-driven plow having a triangular-shaped frame carrying a series of disk plows arranged in gang capable of individual and independent vertical movement and also whereby the entire series may be raised and lowered simultaneously.

Furthermore, the object of the invention is to provide a motor-driven plow having a triangular-shaped frame pivoted on one side to a trunnion secured to the hub of one of the driving-wheels of a motor and the opposite side of the frame having a hinged connection between the trunnion and frame.

Furthermore, the object of the invention is to provide a motor-driven plow having a cable steering device operated by the fifth-wheel of the motor and a device for taking up the slack in the cable while turning corners and to hold the cable taut at all times.

Finally, the object of the invention is to produce a motor-driven gang-plow arranged in a compact form provided with steam raising and lowering means simple in construction, efficient and durable in service, and inexpensive of manufacture.

With the above and other objects in view the invention consists in the details of construction and in the arrangement and combination of parts to be hereinafter more fully set forth and claimed.

In describing the invention in detail reference will be had to the accompanying drawings, forming a part of this specification, wherein like characters denote corresponding parts in the several views, and in which—

Figure 1 is a plan view of the frame of the plow. Fig. 2 is a top plan view of the frame with the disks connected thereto. Fig. 3 is a perspective view with one disk attached. Fig. 4 is a rear view. Fig. 5 is a view, partly in section, showing the steam raising and lowering means and the connection between the steam-piston and disks. Fig. 6 is a top plan view showing the flexible cables connected to the semicircle. Fig. 7 is a plan view of the disk beam and adjustable brace. Fig. 8 is a view showing a moldboard-plow substituted in place of a disk plow. Fig. 9 is a view showing the trunnion attached to the hub of the driving-wheel. Fig. 10 is a view showing the slack-take-up in full and dotted lines. Fig. 11 is a view illustrating the means used for securing the beams on the trunnions.

The present invention relates to a form of motor-driven plow such as is shown in my application, filed February 28, 1903, Serial No. 245,527.

In the drawings, 1 indicates the fire-box of a traction-engine, and 2 2 the driving-wheels, which are suitably mounted on the ends of the axle 4. The front axle 5 is pivotally secured to the front end of the boiler (not shown) by means of the body or king bolt 6, which is partly illustrated in the drawings for the purpose of showing the means I provided for connecting one end of the steering-cable by which the plow is guided in order that it may travel parallel with the engine.

In outline the frame of my plow is approximately a triangle, which I make out of wood or iron, or of wood and iron combined, and it is to be noted that I do not limit myself to the use of either material, as a strong and durable frame may be constructed out of either iron or wood or by combining the two together—that is to say, by having the main beams made of wood and braced by iron braces.

I construct the frame of three main beams 7, 8, and 9. The beam 7 extends transversely parallel with the rear of the engine and is provided at one end with a supporting ground-wheel 10, which is suitably journaled thereon. I connect one end of beam 9 to beam 7 near the opposite end from the supporting ground-wheel and extend it rearwardly parallel with the engine. I connect one end of beam 8 to the beam 7 near the supporting ground-wheel, and its opposite end is secured to the rear end of the beam 9, thus forming the hypotenuse of the triangular-shaped frame.

I provide braces 11 12, which extend longitudinally parallel rearwardly with the engine and have one end secured to the beam 7 and their opposite ends secured to the beam 8. I also provide braces 13, 14, and 15, which are secured transversely the frame by connecting one of the ends of said braces to the beam 9 and their opposite ends to the beam 8. It will be noticed that the three last braces referred to extend parallel with each other for reasons to be hereinafter more fully set forth.

The brace 13 and beam 7 are connected with a beam or brace 16, which extends approximately parallel with the beam 9. A brace 17, extending parallel with the beam 8, has one end secured to the beam 7 and its opposite end secured to the brace 16, said brace 17 supporting a wide brace 18, which is secured at one end to the beam 8 and at its opposite end to the brace or beam 16.

Having fully described the construction of the frame, I will proceed to describe the manner or means by which I connect the frame to the engine or motor.

I provide on one side a connecting-beam 19, which is connected by a hinge 20 to the beam 7. On the opposite side of the engine or motor I provide a rigid beam 21. The beam 21 is adjustable, secured to the beam 7 and to the brace 13 by means of several apertures in the beam and brace, or when desired the beam 21 may be secured to the beam 7 and brace 13 by means of a clip; but I prefer to secure said beam by means of bolts run through the apertures in the beam and brace 13. As it is a well-known fact that all traction engines or motors are not of a uniform width, the adjustable beam provides the means for securing the frame to engines or motors of a different width. A guide-wheel 22, which supports the rear of the frame, is pivotally mounted between the braces 14 and 15 and is provided with an arm 23, secured to the top of the pivot of the guide-wheel. On the beam 9, near the point where it is connected to the beam 7, I secure a loose pulley-wheel 24, which is also provided with an arm 25, and between the arms 23 and 25 I provide a rigid connecting-rod 26.

Connected to the bolt 6 are two rods 27 and 28, which extend rearwardly under the fire-box and under the beam 7 and have their opposite ends connected by a cross-piece 29. The cross-piece 29 is movably supported by clips 30 and 31, and at each end of the cross-piece I provide loose pulley-wheels 32 and 33, which are suitably journaled thereto.

A flexible cable 34, having one end secured to the wheel 24, extends over the loose pulley 32, thence under the axle 4, over loose pulley 35, which is secured to one corner of the fire-box, thence in an oblique direction and having its opposite end connected to an adjusting-bolt 36, said adjusting-bolt being secured to a semicircular device 37, attached to the front axle 5 of the engine.

A second flexible cable 38 is secured at one end to the wheel 24 immediately opposite from the point of connection of the first-named cable and extends over the pulley 33, thence under the rear axle of the engine, over a loose pulley 39, secured to the corner of the fire-box, thence in an oblique direction, crossing the first-named cable, and having its opposite end connected to an adjusting-bolt 40, carried by the semicircle 37, which is attached to the front axle.

It will be observed that by the arrangement of the flexible cables as above described I provide means for guiding the plow and means for holding the cables taut at all times.

In traveling over rough or uneven ground it will be seen that should the front engine-wheels drop—for example, into a dead furrow—the distance between pulleys 33 and pulleys 39 is lessened and the cable 34 thereby slackened. This slack under such conditions is compensated for by rods 27 28, moving cross-piece 29 (carrying pulleys 32 33) backward to the dotted-line position shown in Fig. 10, thus taking up the slack in the cable 34. On the other hand, should the front engine-wheels pass over a ridge the rods 27 28 move forward, and thus pull the cross-piece 29 toward the front of the engine, increasing thereby the length of the cable 34 to prevent breakage of the same.

A shaft 41 is secured to the beam 8 by brackets 42, 43, 44, 45, and 46. Pivotally mounted on the shaft 41 are split thimbles 47, having an extension of the meeting edges 48 bent at an angle to the body portion and provided with apertures 50 at each end. Connected to one end of the portion 48 of the split thimbles are disk-beams 51, said beams being provided with a curved outer end having an aperture 52, in which the axle of the disk is pivotally mounted. The thimbles are separated from the next adjoining series of thimbles by a collar 47', said collar being rigidly secured on the shaft 41.

I provide an adjustable brace comprising two sections 53 and 54 and connected by an adjusting-nut 55 between the thimble and the rear of the disk, one end of the brace being connected to the edge extension of the thimble and the opposite end connected to the disk-beam in the rear of the disk. In the use of disk plows the disk is susceptible of side pressure while in operation, and to prevent the accidental breaking of the disk-beam I provide the adjustable brace and attach it in such a manner that it braces the disks against any side pressure which may be caused when the disks are in the ground.

Standards 56, 57, and 58 are secured to the beam 8 in a vertical position, and journaled in apertures near the upper ends of said posts is a shaft 59. Said shaft extends parallel with the beam 8. On the shaft 59 I rigidly secure horizontally-extending arms 60. The outer ends of the arms are provided with a bifurcated portion 61, the upper surface of which is concaved and the lower surface being convexed in shape. Between the bifurcated portion a vertical rod 62 reciprocates, the rod being held from accidental displacement from the bifurcated portion by means of a bolt 63. The rod 62 is provided intermediate its length with a lug 64 and at its upper end with a pin 65, the lower end of the vertical rod being attached to the disk-beam and the upper end capable of a reciprocating motion between the bifurcated portion of the arm 60.

Seated between the lug 64 and the arm 60 is a spiral spring 66, which encircles the vertical rod 62, said spring exerting pressure on the disk-beams through the medium of the rod 62 and at the same time permits of a vertical independent movement of the disk when it strikes against a stone or any obstruction in its path of travel, and the disk will ride over the obstruction, thus relieving the operator from elevating the entire gang of disks.

I will now describe the means employed for raising and lowering the entire gang of disks. I am aware that steam means have been employed in raising the entire gang of disks; but in no instance do I know of in which steam-pressure can be exerted on the disks that will force the disks into hard ground.

A steam-cylinder 67, which is securely mounted on the frame, is connected to the steam-supply by means of the pipes 68 and 69, steam to said pipes being controlled by means of a valve 70. The interior of the cylinder is provided with an ordinary piston-head 71, which is connected to the piston-rod 72. Suitable ways 73 are provided for the stationary block carrying the piston to reciprocate thereon.

A depending arm 74, rigidly attached to the shaft 59 approximately its longitudinal center, is connected to the end of the piston-rod by means of a link 75. When steam is permitted to enter the front end of the cylinder, the piston-head is forced toward the opposite end of the cylinder, and through the medium of the depending arm and link the entire gang of disks is elevated, and just as long as the steam-pressure is maintained against the piston-head the disks will remain in such elevated position.

When the operator desires to lower the disks, steam is admitted in the rear end of the cylinder and the piston-head is forced toward the front of the cylinder, and through the medium of the depending arm, link, and piston-rod the entire gang of disks is lowered, and when the disks strike the ground, should it be hard and the disks not enter the soil, the pressure of steam against the piston-head will exert a pull on the depending arm, and through the vertical rod and spring encircling said vertical rod pressure will be exerted to force the disks into the ground. I have found by a practical test that pressure sufficient to break the hardest chilled-steel disks can be exerted in the manner above described.

In Fig. 8 I show a plow connected to the thimble by means of an ordinary clevis, and when plows—that is to say, moldboard-plows—are used in place of the disks the rod 62 is secured to top of the beam of the plow and the plow is raised and lowered by the same means employed to raise and lower the disks.

The plow-frame may be secured on the ends of the rear axle of the engine or motor, or it may be secured by means of trunnions 76, which are bolted to the hub of the driving-wheels of the engine, as shown in Fig. 9.

The construction, operation, and advantages will, it is thought, be understood from the foregoing description, it being noted that various changes may be made in the proportions and details of construction without departing from the scope of the invention.

Having fully described my invention, what I claim as new, and desire to secure by Letters Patent, is—

1. In a motor-driven plow, a frame, a disk-shaft carried by said frame, disk-beams having disks mounted thereon pivotally carried by the disk-shaft, spring-actuated means for permitting the independent vertical movement of the disks, steam-actuated means for raising and lowering the entire series of disks and steering means actuated by the front axle of the motor substantially as described.

2. In a motor-driven plow, a triangular-shaped frame, means for connecting the frame to a motor, a disk-shaft carried by the frame, disk-beams each provided with a disk and pivotally secured to the disk-shaft, spring-actuated means for permitting the independent vertical movement of the disks, steam-actuated means for raising and lowering the entire series of disks, a flexible steering device operated by the front axle of the motor and means for holding the flexible steering device taut substantially as described.

3. In a motor-driven plow, an approximately triangular-shaped frame, disk-carrying beams carried by the frame, a shaft supported by the frame, horizontally-disposed arms rigidly secured to said shaft, rod connections between said horizontally-disposed arms and the disks, steam-actuated means for raising and lowering the entire gang of disks, a cable steering device operated by the front axle of the motor and means for holding the cables taut as and for the purpose set forth.

4. In a motor gang-plow, an approximately triangular-shaped frame, a guide-wheel connected to the frame, disks carried by said frame, means for connecting said frame to a motor, comprising a rigid beam on one side and a hinged beam upon the other side, flexible cable for operating the guide-wheel of the frame, steam-actuated means for raising and lowering the disks and means for permitting the independent vertical movement of the disks substantially as described.

5. In a motor gang-plow, an approximately triangular frame, means for connecting said frame to the rear wheels of a motor, a shaft carried by the frame and disk-beams pivotally mounted on said shaft, a second shaft mounted on upright posts immediately over the first-named shaft, horizontally-extending arms rigidly secured on the last-named shaft, rod connections between the horizontally-extending arms and disk-beams, a steam-cylinder carried by the frame and connections between the steam-piston and the second named shaft for raising and lowering the entire series of disks, flexible steering means and means for holding the flexible steering means taut substantially as set forth.

6. In a gang disk plow, steam-actuated means for raising and lowering the disks, a guide-wheel pivotally secured on the frame, flexible cables having one end secured to a semicircle carried by the front axle of a motor and their opposite ends secured to a loose wheel carried by the plow-frame, rod connection between the loose wheel and guide-wheel of the plow-frame and means for holding the cables taut as and for the purpose set forth.

7. In a gang disk plow for traction-motors, an approximately triangular-shaped frame, means for attaching the frame to a motor, comprising a rigid adjustable beam and a hinged beam, pivotally mounted on trunnions secured to the outer ends of the hub of the rear ground-wheels of the motor, as and for the purpose set forth.

8. In a motor gang disk plow the combination with a motor of a triangular-shaped frame and means for attaching said frame to the motor of a steering device operated by the front axle of the motor and means for holding the steering device taut, comprising rods having one end connected to the king-bolt of the motor and their opposite ends connected to a cross-piece carrying loose pulleys and adapted to reciprocate on clips carried by the plow-frame substantially as described.

9. In a motor-plow, a triangular-shaped frame, disk-beams carried by the frame, a shaft mounted on vertical posts immediately over the disk-beams, horizontally-extending arms secured on the last-named shaft, rod connections between the horizontally - extending arms and disk-beams, spiral springs encircling the connecting-rod, a depending arm rigidly connected to the shaft, a steam-operated piston, steam connection with the motor, a link connection between the depending arm and steam-operated piston, flexible cables having one end connected to a semicircle carried by the front axle of the motor and their opposite ends connected to a loose wheel mounted on the plow-frame, rods having one end secured to the body-bolt of the engine and extending rearwardly beneath the fire-box of the motor and having their opposite ends connected by a cross-piece, pulleys mounted in said cross-piece over which the flexible cables run, means attached to the frame for permitting the reciprocating movement of the rods and cross-piece substantially as described.

10. In a motor-driven plow, an approximately triangular-shaped frame pivotally secured to a motor, a shaft having a plurality of split thimbles secured thereon, carried by the frame, disk-beams provided with disks secured to the split thimbles, adjustable braces having one end secured to the split thimbles and their opposite end secured to the disk-beam, a second shaft journaled in vertical posts secured to the frame, means of connection between the second-named shaft and the disk-beams, steam-actuated means for raising and lowering the entire gang of disks, a flexible steering device operated by the front axle of the motor, means for taking up the slack in the flexible cables substantially as described.

In testimony whereof I affix my signature in presence of two subscribing witnesses.

WILLIAM H. MILTON.

Witnesses:
  A. E. ASHER,
  C. F. BUCHER.